United States Patent [19]

Thary

[11] Patent Number: 5,112,543
[45] Date of Patent: May 12, 1992

[54] MOLDING OF OPEN CELL SOFT POLYURETHANE FOAM UTILIZING RELEASE AGENT

[75] Inventor: Christian Thary, Farmington Hills, Mich.

[73] Assignee: Creme Art Corporation, Walled Lake, Mich.

[21] Appl. No.: 454,645

[22] Filed: Dec. 21, 1989

[51] Int. Cl.⁵ ............................................ B29C 33/58
[52] U.S. Cl. .................................. 264/51; 264/130; 264/300; 264/338
[58] Field of Search ......... 264/51, 139, 300, DIG. 83, 264/DIG. 77, 338; 524/556; 425/90-98

[56] References Cited

U.S. PATENT DOCUMENTS

| | | | |
|---|---|---|---|
| 3,474,166 | 10/1969 | Babcock | 106/38.24 |
| 3,823,023 | 7/1974 | Duggins et al. | 264/338 |
| 3,940,356 | 2/1976 | Byrnes | 252/70 |
| 4,038,088 | 7/1977 | White et al. | 264/338 |
| 4,131,662 | 12/1978 | Cekoric et al. | 264/51 |
| 4,169,172 | 9/1979 | Bethe | 264/213 |
| 4,171,337 | 10/1979 | Rosen et al. | 264/56 |
| 4,299,741 | 11/1981 | Doehnert | 524/45 |
| 4,473,403 | 9/1984 | Wesala | 106/38.24 |
| 4,491,607 | 1/1985 | Wesala | 264/338 |
| 4,609,511 | 9/1986 | Fischer et al. | 264/51 |
| 4,740,324 | 4/1988 | Schur | 264/338 |
| 4,770,827 | 9/1988 | Fischer | 264/51 |
| 4,783,296 | 11/1988 | Fischer et al. | 264/51 |
| 4,808,360 | 2/1989 | Natori et al. | 264/338 |

*Primary Examiner*—Jay H. Woo
*Assistant Examiner*—Robert B. Davis
*Attorney, Agent, or Firm*—Brooks & Kushman

[57] ABSTRACT

A method for molding open cell soft polyurethane foam and a release agent utilized in the method are disclosed as incorporating an aqueous gel coated (30) onto interior surfaces (18,20) of a mold (10) prior to introduction of a foamable liquid polyurethane mixture (32) whose foaming fills the mold cavity (22) as the aqueous gel functions as a solventless release agent that has good lubricity to facilitate filling of the cavity by the foam (34), prevents bonding of the foam (34) to the mold and also provides a thin film-like escape passage (36) for gas generated during the foaming. An acrylic acid polymer that is acid neutralized is preferably utilized to provide the aqueous gel. The acrylic acid polymer and acid neutralizer are most preferably sprayed as separate aqueous mixtures onto the interior mold surfaces to provide the aqueous gel.

3 Claims, 1 Drawing Sheet

U.S. Patent
May 12, 1992
5,112,543
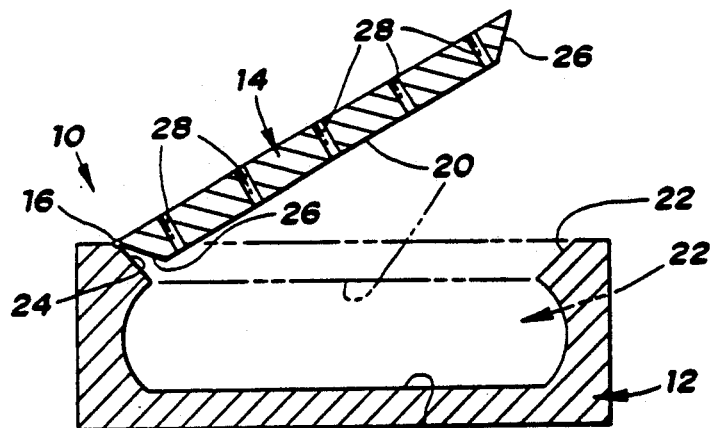
Fig. 1
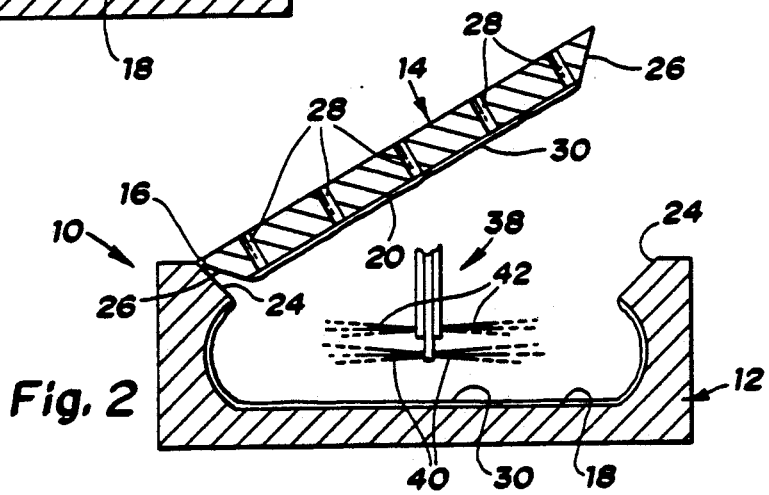
Fig. 2
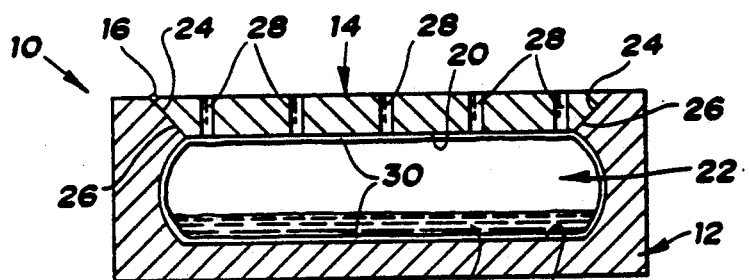
Fig. 3
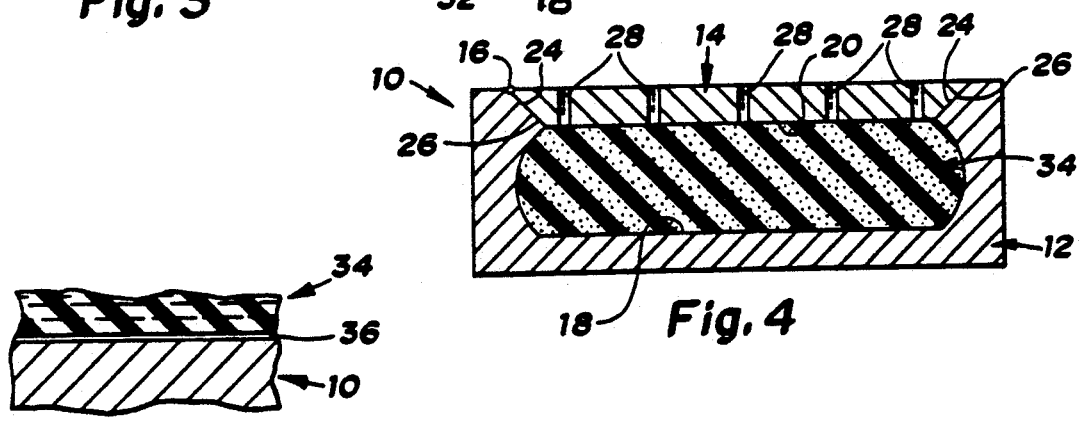
Fig. 4
Fig. 5

MOLDING OF OPEN CELL SOFT POLYURETHANE FOAM UTILIZING RELEASE AGENT

TECHNICAL FIELD

This invention relates to a method for molding an open cell soft polyurethane foam and to a release agent used in such molding.

BACKGROUND ART

Liquid polyurethane foam mixtures are conventionally molded within a mold whose mold cavity is coated with a release agent in order to prevent the polyurethane foam from bonding to the mold cavity during the polymerization that takes place. Conventional release agents of this type include dispersions or emulsions of fats, waxes, soaps, greases, or oils etc. that are interposed between the mold surface and the liquid foam mixture within the mold cavity to prevent bonding of the polyurethane foam to the mold. These release agents conventionally include at least some water in the dispersion or emulsion as disclosed by U.S. Pat. Nos. 3,474,166 Babcock; 3,823,023 Duggins et al; 4,038,088 White et al; 4,131,662 Cekoric et al; 4,169,172 Bethe; 4,473,403 Wesala; 4,491,607 Wesala; 4,609,511 Fischer et al; and 4,783,296 Fischer et al.

Since any water in such release agents prevents the polyol/isocyanate reaction of the polyurethane liquid foam mixture from proceeding, it is conventional to fully dry the release agents on the mold cavity surfaces prior to introduction of the polyurethane foam liquid mixture. Such drying necessarily increases the cost and increases the cycle time of the molding process. Also, in order to perform the drying, it is conventional for the release agent to include a solvent that affects the environment upon passage to the atmosphere.

When open cell soft polyurethane foam is molded, the polyol/isocyanate reaction proceeds sufficiently so that the gas generated bursts the bubbles that are formed during the foaming process. Molds in which this molding is performed must be provided with vents for such gas to escape in order to prevent a pressure buildup that adversely affects the complete filling of the mold and uniformity of the resultant molded foam article.

Other release agents, etc. encountered during the investigation conducted for the present invention are disclosed by U.S. Pat. Nos. 3,468,989 McMillan; 3,519,444 Brown et al; and 4,690,788 Yada et al.

DISCLOSURE OF INVENTION

An object of the present invention is to provide an improved method and release agent for molding open cell soft polyurethane foam.

In carrying out the above object, the method for molding open cell soft polyurethane foam is performed within a mold having rigid mold portions movable between open and closed positions with respect to each other and having interior surfaces that cooperatively define a generally enclosed mold cavity in the closed position. The method is performed by coating the interior surfaces of the mold portions with an aqueous gel and by then introducing a foamable liquid polyurethane mixture into the mold for foaming. Such foaming fills the mold cavity as the aqueous gel at the interior surfaces functions as a release agent to prevent bonding of the foam to the interior surfaces and to also define a thin escape passage for gas generated during the foaming.

Provision of the water in the semi-solid gel state prevents the water from interfering with the polyol/isocyanate reaction while nevertheless functioning as a release agent without any solvent. Also, the aqueous gel has good lubricity to facilitate foam flow along the mold cavity surfaces to fill the mold cavity as well as providing the thin escape passage for the gas generated by the foaming.

In the preferred practice of the open cell soft polyurethane foam molding method, a mixture of water and an acrylic acid polymer that is acid neutralized is coated onto the interior surfaces of the mold to provide the aqueous gel. More specifically, the mixture of water and acrylic acid polymer and the acid neutralizer are sprayed separately onto the interior mold surfaces to provide the aqueous gel by acid neutralization that takes place after the two sprays impinge with the mold surfaces and mix with each other.

A release agent for use in open cell soft polyurethane foam molding in accordance with the invention is used on interior mold surfaces of rigid mold members that are movable with respect to each other between open and closed positions. The release agent includes an acrylic acid polymer that is combinable with water to provide an aqueous mixture and also includes an acid neutralizer that is combinable with the aqueous acrylic acid polymer mixture to provide an aqueous gel. As previously mentioned in connection with the description of the method, this aqueous gel prevents bonding of the foam to the mold surfaces and also provides a thin escape passage for gas generated during the foaming of the polyurethane foam.

BRIEF DESCRIPTION OF DRAWINGS

FIG. 1 is a sectional view taken through a mold including rigid mold members movable between an open position as shown by solid line representation and a closed position as shown by phantom line representation in order to permit molding of open cell soft polyurethane foam in accordance with the present invention;

FIG. 2 is a partially broken away view of the open mold illustrated with an aqueous gel applied to the interior mold surfaces in preparation for the molding in accordance with the present invention;

FIG. 3 is a view that illustrates the mold after introduction of a foamable polyurethane liquid mixture and closing of the mold for the molding;

FIG. 4 illustrates the mold at a further stage after the liquid mixture has foamed to provide an open cell soft polyurethane foam that fills the mold cavity; and FIG. 5 is a partial view on an enlarged scale that illustrates the interface between the liquid mixture/foam and the mold cavity surface where bonding is preventing by the aqueous gel coating.

BEST MODE FOR CARRYING OUT THE INVENTION

With reference to FIG. 1 of the drawings, a mold 10 is illustrated as including a rigid lower receptacle mold portion 12 and a rigid cover mold portion 14 as well as a pivotal connection 16 about which these mold portions are movable with respect to each other between the open position shown by solid line representation and the closed position shown by phantom line representation. The lower receptacle mold portion 12 has an interior surface 18 that defines an upwardly opening receptacle shape, while the upper cover mold portion 14 has an interior surface 20 that cooperates with the interior surface 18 in the closed position to define a generally closed mold cavity 22. The mold portions 12 and 14 have tapered edges 24 and 26, respectively, that cooperate in sealing the mold cavity in the closed position. Vent openings 28 are provided in the cover mold portion 14 and have a pattern/spacing relationship and a size for permitting gas generated during the foaming to escape in accordance with conventional polyurethane molding technology. Otherwise, both of the mold portions 12 and 14 are impervious to the gas generated by the foam.

As illustrated in FIG. 2, an aqueous gel 30 is coated on the interior surfaces 18 and 20 of the mold portions 12 and 14 at the beginning of each cycle. This coating is performed with the mold 10 in its open condition. A foamable liquid polyurethane mixture 32 is then introduced into the mold as shown in FIG. 3 and the cover mold portion 14 is closed to provide the enclosed mold cavity 22 in which the foam molding takes place. The foamable polyurethane liquid mixture 32 then reacts with a polyol/isocyanate reaction to fill the mold cavity 32 as shown in FIG. 4 to provide an open cell soft polyurethane foam article 34. Due to its semi-solid gel state, the water of the gel coating 30 does not interfere with the polyol/isocyanate reaction of the foamable polyurethane mixture 32. Thus, as described below, the gel coating 30 functions as a release agent without the need for any solvent that would affect the environment upon passage to the atmosphere.

During the foaming that provides the foam article 34, the aqueous gel coating 30 at the interior surfaces 18 and 20 of the mold functions as a release agent to prevent bonding of the foam to these interior surfaces and, as illustrated in FIG. 5, to also define a thin escape passage 36 at the interface of the mold 10 and the foam article 34 such that gas generated during the foaming can escape for venting. More specifically, the polyol/isocyanate reaction of the polyurethane liquid mixture 32 foams as the aqueous gel coating 30 provides lubrication that facilitates the foam flow along the mold cavity surfaces 18 and 20 to ensure filling of the mold cavity 22. This foaming generates heat that dries the aqueous gel coating 30 but only after the surface of the foam article 34 has initially formed so the thin film-like escape passage 36 is provided such that the gas generated by the foaming can escape. Thus, this gas flows through the passage 36 around the foam article 34 from the receptacle mold portion 12 and along the upper surface of the foam article 34 to the vents 28 of the cover mold portion 14.

The open cell soft polyurethane foam molding method described above is most preferably performed with an acrylic acid polymer that is acid neutralized and coated onto the interior surfaces 18 and 20 of the mold 10 to provide the aqueous gel coating 30. More specifically, as illustrated in FIG. 2, a spraying apparatus 38 is provided for providing a spray 40 of a mixture of water and the acrylic acid polymer and a spray 42 of water and the acid neutralizer. Upon mixing of the acrylic acid polymer spray 40 and the acid neutralizer spray 42 on the mold cavity surfaces, the aqueous gel coating 40 is formed to function as the release agent described above.

Good results have been achieved by the use of an acrylic acid polymer manufactured by the Specialty Polymers & Chemicals Division of the B. F. Goodrich Company of Cleveland, Ohio, U.S.A., under the Trademark CARBOPOL. More specifically, the acrylic acid polymers designated as CARBOPOL 934 and CARBOPOL 940 with molecular weights of about 3,000,000, and 4,000,000, respectively, have been used. Furthermore, the acid neutralization of the acrylic acid polymer to a ph of 7 provides branching of its straight molecules and a consequent viscosity increase to a gel state generally within the range of about 60,000 to 100,000 centipoise. More specifically, the acid neutralizer used may be triethanolamine in the amount of 1.6 times the weight of CARBOPOL used. Other types of acid neutralizers can also be used such as diethanolamide.

A specific example of one aqueous gel is set forth by the follow Example with the amount of each component indicating percentage by weight in the resultant gel.

| Component | EXAMPLE Purpose | Weight |
| --- | --- | --- |
| $H_2O$ | Wets | 97.4% |
| Acrylic Acid Polymer (CARBOPOL 940) | Forms Gel | 1.0% |
| Triethanolamine | Neutralizes the acrylic acid polymer to increase viscosity | 1.6% |

While the best mode for practicing the invention has been described in detail, other ways of practicing the invention will be apparent to those skilled in the art to which this invention relates as defined by the following claims.

What is claimed is:

1. A method for molding open cell soft polyurethane foam within a mold having rigid mold portions movable between open and closed positions with respect to each other and having interior surface that cooperatively define a generally enclosed mold cavity in the closed position, the method comprising:
   coating the interior surfaces of the mold portions with an aqueous gel of an acrylic acid polymer; and
   introducing a foamable liquid polyurethane mixture into the mold for foaming to fill the mold cavity as the aqueous gel at the interior surfaces functions as a release agent to prevent bonding of the foam to the interior surfaces and to also define a thin escape passage for gas generated during the foaming.

2. An open cell soft polyurethane foam molding method as in claim 1 wherein the acrylic acid polymer is acid neutralized and is mixed with water for the coating onto the interior surfaces of the mold to provide the aqueous gel.

3. An open cell soft polyurethane foam molding method as in claim 2 wherein the mixture of water and acrylic acid polymer are sprayed onto the interior mold surfaces and wherein the acid neutralizer is sprayed separately from the mixture of water and acrylic acid polymer onto the interior mold surfaces to provide the aqueous gel.

* * * * *